April 12, 1960
G. ROVE ET AL
2,932,154
ELAPSED-TIME METER
Filed June 16, 1958
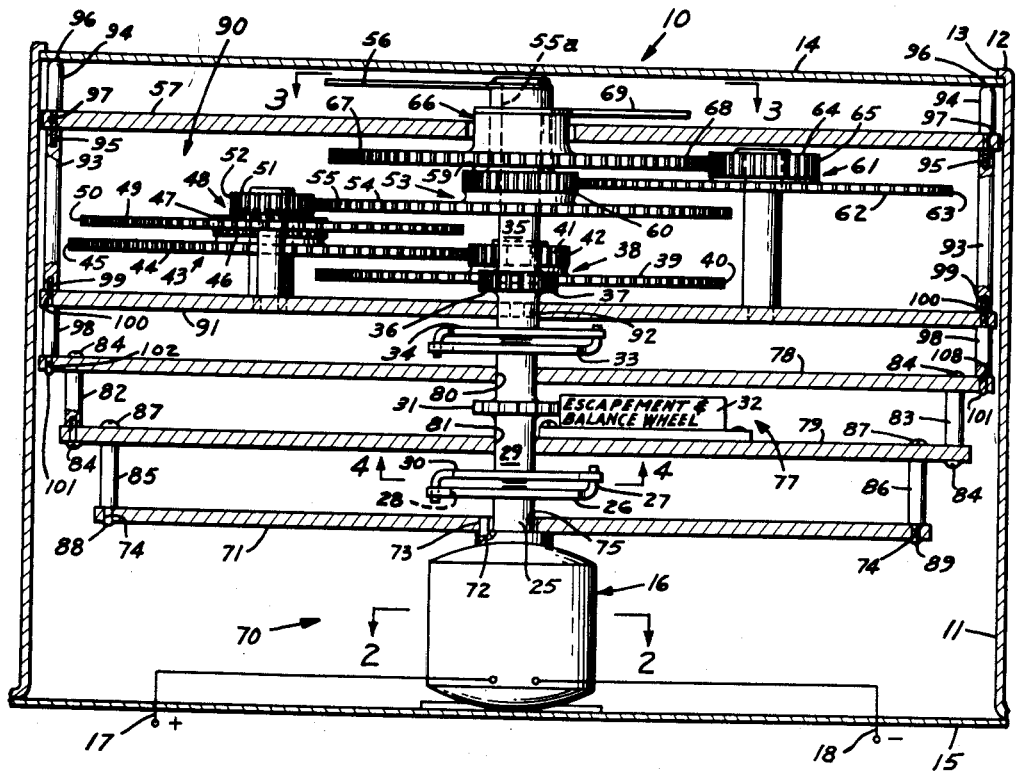
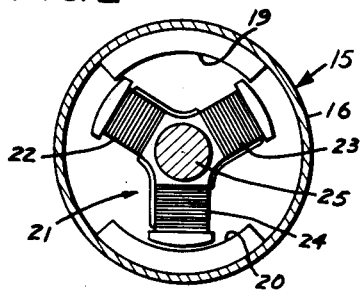
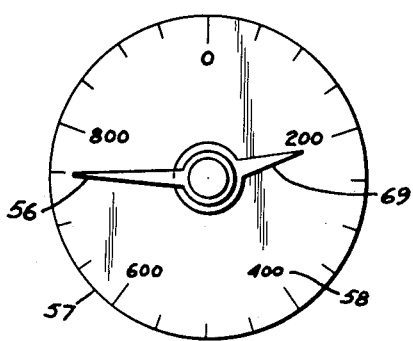
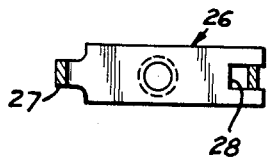
INVENTOR.
GENE ROVE
PHILIP H. BORDEN
BY
D. Gordon Angus
ATTORNEY.

United States Patent Office 2,932,154
Patented Apr. 12, 1960

2,932,154
ELAPSED-TIME METER

Gene Rove, Sherman Oaks, Calif., and Philip H. Borden, Cincinnati, Ohio, assignors to Carol Campbell Enterprises, Inc., North Hollywood, Calif., a corporation of California Application June 16, 1958, Serial No. 742,170

2 Claims. (Cl. 58—146)

This invention relates to an elapsed time meter.

An object of this invention is to provide a meter which can be connected to a mechanism such as an aircraft engine whose total time in operation is to be recorded. The intended use of this meter may be illustrated by the following example. It is well known that maintenance time on many aircraft components, such as aircraft engines, is determined by the total number of hours the engine has been operated. Heretofore, it has been customary to manually record the operation time by calculating the elapsed time between take-off and landing times, which are shown in the aircraft in-flight forms, and then transferring the elapsed time to a cumulative record of engine time. The opportunity for clerical error is obvious.

In addition, when elapsed time is calculated from flight entries, many periods of engine operation, often under severe conditions, are omitted. For example, preflight tests, taxiing operations, and engine check-out time are customarily excluded from the record of engine operation. In addition, on multi-engine aircraft, particularly those having four or more engines, it is common to shut off some of the inboard engines during taxiing operations, thereby running up a different number of hours for each engine, which is not disclosed by records as presently kept.

Accordingly, an object of this invention is to provide a meter which operates while the mechanism to which it is attached is in operation, and which stops when the mechanism is not in operation, so as to give a reliable and error-free indication of operating time of the mechanism.

Because it is a principal requirement of airborne components that they be light in weight, an additional object of this invention is to provide a light-weight meter. A meter according to this invention which measures up to 10,000 hours of operation for a single sweep of its hand, has been manufactured and successfully tested which weighs only 1.2 ounces.

This invention utilizes an electrically driven motor which is adapted to be operated simultaneously with the mechanism whose operation time is to be measured. The motor drives a shaft which turns an escape wheel. The escape wheel is engaged to an escapement and a balance wheel mechanism which limit the rotational speed of the shaft. The shaft, in turn, drives a reducing gear train which includes an escape gear that turns a pointer which indicates the amount of elapsed time.

The invention will be fully understood from the following detailed description and the accompanying drawings, of which:

Fig. 1 is a side elevation, partly in cut-away cross-section, showing a preferred embodiment of the invention; and Figs. 2, 3 and 4 are cross-sections taken at lines 2—2, 3—3 and 4—4, respectively, of Fig. 1.

In Fig. 1, an elapsed time meter 10 is shown which has an outer case 11 which is preferably cylindrical, the case having a rim 12 which defines an opening 13. A cover glass 14 contained within the case bears against the rim 12, to give visual access to the meter. A back cover plate 15 closes the other end of the case.

A three pole D.C. motor 15 is placed in the case and its case 16 is held against rotation relative thereto by means to be described. Leads 17 and 18 are connected to the motor terminals, and to a source of D.C. electricity, which source is energized whenever the component whose elapsed time is to be measured is in operation. As an example, the motor can conveniently be connected to the ignition switch of an aircraft engine, because the ignition switch is invariably on and carrying an electric current when the engine is in operation, and is routinely turned off when the engine is out of operation.

As best shown in Fig. 2, a pair of curved pole pieces 19 and 20 are attached to the motor case 16, and an armature 21 is rotatably mounted between the pole pieces. The armature includes three windings 22, 23, 24 which are connected in a well-known fashion which does not require description here. The motor is provided with slip rings and commutators (not shown) in accordance with standard motor design.

The motor drives a shaft 25. A coupling member 26 is pressed onto said shaft. This coupling member has a curved tongue 27 at one end and a slot 28 at its other end (see Fig. 4). Again with reference to Fig. 1, it will be seen that a second shaft 29 has an identical coupling member 30 pressed thereon, and that its tongue enters slot 28 in coupling member 26, and the tongue of the coupling member 26 enters the slot of coupling member 30. This cooperative engagement between coupling members 26 and 30 constrains shaft 29 to rotation with shaft 25, so that shaft 29 essentially comprises an extension of shaft 25.

An escape wheel 31 of the type commonly used in watch mechanisms is formed integral with shaft 29. If preferred, the escape wheel could be manufactured separately and attached to shaft 29, this being merely a matter of manufacturing technique. The escape wheel engages an escapement and balance wheel mechanism 32. This escape and balance wheel mechanism is of the type well known in watch making. A showing of a suitable escape wheel 31 and escapement and balance wheel mechanism 32 may be found in most standard works on horology. For example, a suitable mechanism is shown in "A Practical Course in Horology" by Harold C. Kelly, published in 1954 by The Manual Arts Press, Peoria, Illinois, at page 111.

As is well known, torque applied to an escape wheel oscillates an escapement mechanism, the rate of oscillation of which is regulated by a balance wheel. Within a wide range of torque values, the rate of oscillation of the balance wheel is substantially constant. Accordingly, when torque is applied to shaft 25 and thus to shaft 29, the escape wheel tends to operate the escapement and balance wheel mechanism. In turn, the escapement and balance wheel mechanism limit the rate of rotation of the escape wheel, thereby regulating the rate of rotation of the shafts 25 and 29.

A coupling member 33 is attached to shaft 29 and a similar coupling member 34 is attached to a shaft 35 (these coupling members being identical to coupling member 26). Shaft 35 essentially comprises an extension of shafts 25 and 29, and is driven at a rate limited by the escapement and balance wheel mechanism.

Shaft 35 carries a pinion gear 36, which has pinion leaves 37 thereon. The leaves 37 turn at the same angular rate as shaft 35. A second gear 38 has a wheel 39 with teeth 40 on the periphery thereof, which teeth engage the pinion leaves 37. Gear 38 has a pinion 41 with pinion leaves 42 thereon. A third gear 43 has a wheel 44 with teeth 45 that engage the pinion leaves 42. The third gear also has a pinion 46 with pinion leaves 47 thereon. A fourth gear 48 has a wheel 49 with teeth 50 thereon, which teeth engage the pinion leaves 47. The fourth gear also has a pinion 51 with pinion leaves 52 thereon.

An escape gear 53 comprises a fifth gear in the train and includes a wheel 54 with teeth 55 on its periphery. Teeth 55 engage the pinion leaves 52. The escape gear has a central passage 55a so that the gear 53 makes a slip fit on shaft 35, and rotates independently of shaft 35. A pointer 56 is pressed onto escape gear 53 for indicating the elapsed time with reference to a dial plate 57 which bears indicia of time 58. In the embodiment shown, pointer 56 makes one complete sweep of the dial in 100 hours of operation.

In the event that a longer period of pointer revolution is desired, gear 53 is provided with a pinion gear 59 that has pinion leaves 60 thereon. A sixth gear 61 has a wheel 62 with teeth 63 thereon. Teeth 63 engage pinion leaves 60. Gear 61 is also provided with a pinion gear 64 with pinion leaves 65 thereon.

A second escape gear 66 has a wheel 67 with teeth 68 thereon, which teeth engage the pinion leaves 65. Second escape gear (which is the seventh gear in the train) makes a slip fit over escape gear 53. If pointer 56 is dispensed with and the gear 53 is not used as an escape gear, the upper extension of the gear 53 may be omitted, and the second escape gear 66 can make a slip fit on shaft 35. A pointer 69 is pressed onto the end of the second escape gear 66.

In the example shown, the pointer 69 makes one complete revolution in 1,000 hours. If desired, both pointers 56 and 69 may be used so that the pointer 56 will indicate a fraction of 1,000 hours while the pointer 69 will indicate elapsed thousands of hours.

It will be evident that the gear train may have additional reductions provided therefore for lengthening the period of rotation of the pointer.

Suitable gear ratios for the gear train are as follows:
On 1st gear 36, there are 20 of pinion leaves 37;
On 2nd gear 38, there are 16 of pinion leaves 42, and 50 of teeth 40;
On 3rd gear 43, there are 20 of pinion leaves 47, and 64 of teeth 45;
On 4th gear 48, there are 16 of pinion leaves 52, and 50 of teeth 50;
On 5th gear 53, there are 20 of pinion leaves 60, and 64 of teeth 55;
On 6th gear 61, there are 16 of pinion leaves 65, and 50 of teeth 63;
On 7th gear 66, there are 64 of teeth 68.

The meter can be made up in three separate sections for ease in manufacture and assembly. A first section comprises the motor section 70 wherein the motor case is keyed to a base plate 71 by a key 72 which engages a slot 73 in the base plate. The base plate has a plurality of locator holes 74, and a central passage 75 through which shaft 25 passes. The first coupling member 26 is on the other side of the base plate 71 from the motor. The motor is backed up by the cover plate 15 which may be attached in any desired manner to the case 11 of the instrument.

Another of the separate sections of the meter comprises a regulation section 77, which includes the escapement and balance wheel mechanisms 32, and the escape gear 31. This section is bounded by a pair of backing plates 78, 79, these plates having central passages 80, 81 respectively. A pair of spacers 82, 83 are placed between the backing plates to space them, and these spacers are held to the backing plate 78 by screws 84 which pass through both backing plates and are threaded into the ends of the spacers.

A pair of locator pins 85, 86 are fastened to backing plate 79 by screws 87 and these pins have protruding nibs 88, 89 which enter the locator holes 74 in the base plate 71. It will now be seen that the regulation section is firmly mounted to the motor section 70 so that they will not rotate relative to each other, and so that they are properly spaced from each other with the coupling members 26 and 30 in engagement.

The third separate section of the meter comprises a reduction and read-out section 90. This section includes a pinion plate 91 having a central passage 92 through which shaft 35 extends. Coupling member 34 on the lower end of that shaft engages coupling member 33. Shaft 35 is journaled in passage 92. Gear 53 is journaled on shaft 35. Gear 66 is journaled on gear 53 (or on shaft 35 if preferred). Collars (not shown) may be provided to hold gears 53 and 66 at the proper elevation on their mounting shafts. Gears 38, 43, 48 and 61 are journaled to the pinion plate 91, and it will be observed that their wheels have different elevations relative to the pinion plate.

By stationing the gears at various elevations, the gears can be disposed in a pattern around the central shaft so that the bulk of the instrument is reduced to a minimum. This method of placing gears is well known in watch mechanisms.

On the other side of the gears from the pinion plate 91, there is the dial plate 57. A pair of spacers 93 extend between the dial plate and the pinion plate 91. These spacers are held in place by a pair of locator pins 94 which have a projecting screw-threaded portion 95 at one end, and a rounded portion 96 at the other end. The screw-threaded portion 95 passes through holes 97 in the dial plate and are threaded into one end of the spacers 93. This fastens the locator pins to the dial plate and spaces the dial plate from the cover glass 14.

Other locator pins 98 are provided with screw threaded portions 99 which pass through holes 100 in the pinion plate and are threaded into the lower end of the spacers 93. These locator pins have nibs 101 on their free end, which nibs pass through locator holes 102 in backing plate 78. The locator pins 98 act to space the reduction and read-out section 90 from the regulation section 77, while the spacers 85 and 86 space the motor section 70 from the regulation section 77.

It will be seen that the assembly of the separate sections is simply performed merely by plugging the nibs of the locator pins into the holes, and this permits the sections to be individually replaced.

While the locator pins and spacers have been shown in pairs, this is for convenience in illustration, inasmuch as the number of spacers and locator pins so long as there are at least two, is of no particular importance. It will sometime be preferred to use tthree sets of spacers and locator pins inasmuch as three points determine the location of the planes of the plates more reliably than the two sets which are shown in the drawings.

The operation of the meter will now be described. Leads 17 and 18 are connected to a source of current which is energized simultaneously with the device whose elapsed operational time is to be measured. For example, the instrument could conveniently be connected across the ignition switch if the operational time of an aircraft engine were being checked. The ignition switch is invariably on while the engine is in operation, and personnel are very careful to be certain that the ignition switch is turned off when the engine is out of operation. Then, when current is applied to leads 17 and 18, the motor 15 is operated and applies torque to turn shaft 25.

With this device, a wide range of torque values is tolerable and within that range, variation in the torque has no effect on the ultimate accuracy of the reading. For example, with the motor shown in the drawings, a voltage between 23 to 33 volts D.C., with the motor drawing a current of approximately 20 milliamperes has been used, and the output indication has still been accurate to within 1%, which is a much greater accuracy than is ordinarily attained with the present manual means for recording elapsed times.

The torque from shaft 25 is transmitted through the coupling members 26 and 30 to shaft 29, and thus to the escape wheel 31. The torque applied to the escape wheel 31 is applied as a force to the escapement and balance wheel mechanism 32. This force causes the mechanism 32 to begin to operate and, as is well known, this causes the lever of the escapement to oscillate back and forth and impart its oscillatory forces to a spring-mounted balance wheel. As is well known, the rate of oscillation of the balance wheel is, within operating limits, substantially independent of the forces applied to it from the escapement lever, so that the balance wheel exerts an ultimate limiting effect upon the rate of oscillation of the escapement lever, and this in turn exerts an ultimate limitation on the rate of rotation of the escape wheel 31. This is because the escape wheel 31 can turn by one tooth of its gear for each oscillation of the escapement.

It will be seen that substantially independent of the voltage applied to the motor 15, within operating ranges, the rate of rotation of the motor and of the shaft 29 will be limited to a constant rate by the escapement and balance wheel mechanism 32. Thus, so long as the torque applied to escape wheel 31 is sufficient to operate the device at all, the device will operate at a regulated rate, so that the read-out portion provides a direct and accurate measurement of the elapsed time.

Coupling members 33 and 34 couple shafts 29 and 35 and the rotation of shaft 29 is therefore imparted to the pinion gear 36. The rotation of pinion gear 36 is transmitted through the gear train as hereinabove described, and finally turns the escape gears 53 and 66, which are available for attachment of pointers for indicating the passage of time.

As stated above, in operation this instrument has been found to be accurate to plus or minus 1% in measuring elapsed time even for devices which measure elapsed times as great as 10,000 hours for one complete sweep of the hand. The instrument has operated properly in a temperature range extending between −65° F. and +200° F., and at these temperatures under vibrations between 30 and 600 cycles per second. Simulated altitude tests up to 100,000 feet have been successfully passed.

It has been found preferable not to lubricate this device, but instead to run it dry, because at the extremely low rates of rotation involved, lubricants seem to cause friction, rather than to eliminate it. Furthermore, for operation at high altitudes, evaporation problems become important in lubricants. In fact, one of the advantages of this device is that it can operate without lubrication and can thereby be effective over the entire range of missile and aircraft operating conditions.

The low drain of this motor enables the motor to be used in nearly any circuit without affecting the operation of that circuit itself, and its low current requirements even permit an independent current source, such as a battery, to be used to supply operational current. If such other sources are used, then it will be under the control of some means, such as a switch that is associated with the mechanism whose operational time is to be measured.

This invention thereby provides a reliable and effective means for measuring the elapsed time of operation of various mechanisms. It is light in weight, the example shown in the drawings weighing only 1.2 ounces. It requires only a negligible amount of energy for its operation, and assures an accurate, continuous, and up-to-date reading of the elapsed time of operation of a mechanism.

This invention is not to be limited by the embodiment shown in the drawings and described in the description, but only in accordance with the scope of the appended claims.

We claim:

1. An elapsed-time meter comprising an outer case with an opening for observation, a motor section, a regulation section, and a reduction and read-out section, all of said sections being mounted within said case, said motor section comprising a motor including a case, and a first shaft driven by the motor relative to the case; a first coupling member on and turned by said shaft, and a first plate mounted non-rotatably to said motor case; said regulation section comprising a second rotatable shaft having a second coupling member attached to one end thereof, an escape wheel driven by said shaft, an escapement and balance wheel mechanism for regulating the maximum rate of rotation of said shaft, a third coupling member at the other end of said shaft, second and third plates disposed respectively between said escape wheel and second and third coupling members, the second shaft being journaled to the second and third plates, spacer means holding the second and third plates non-rotatively attached to each other and spaced from each other; one of said first and second plates having locater holes therein and the other of said first and second plates carrying a spacer and locating pin adapted to enter said locating hole to hold the first and second plates against relative rotation and at a spacing from each other; said reduction and read-out section comprising a third shaft carrying a pinion, a fourth and a fifth plate, said third shaft being journaled in said fourth plate, a fourth coupling member attached to said third shaft, spacer members non-rotatively interconnecting and spacing apart said fourth and fifth plates, one of said third and fourth plates having locater holes therein and the other of said plates bearing spacer pins adapted to enter into said locating holes so as to hold the third and fourth plates properly spaced apart and in non-rotative relationship, spacer pins on the fifth plate which contact structure connected to the instrument case at the side opening thereof, reduction gearing disposed between said fourth and fifth plates in meshed engagement with said pinion, a pointer driven by said reduction gearing, and elapsed-time indicia mounted on said fifth plate adjacent to the pointer, whereby with the first and second shafts joined by the first and second coupling members, and the second and third shafts joined by the third and fourth coupling members, the motor drives the pointer subject to regulation by the escapement and balance wheel mechanism, the three sections being held against relative rotation, and in proper spaced relationship by said pins.

2. An elapsed-time meter according to claim 1 in which the coupling members each include a tongue and groove, the tongue of one engaging in a groove of the other.

References Cited in the file of this patent

UNITED STATES PATENTS

| | | |
|---|---|---|
| 1,208,147 | Hall | Dec. 12, 1916 |
| 2,294,031 | Hobbs et al. | Aug. 25, 1942 |
| 2,803,300 | Warkentien | Aug. 20, 1957 |
| 2,864,231 | Springer | Dec. 16, 1958 |

FOREIGN PATENTS

| | | |
|---|---|---|
| 1,069,522 | France | Feb. 10, 1954 |